Patented July 4, 1950

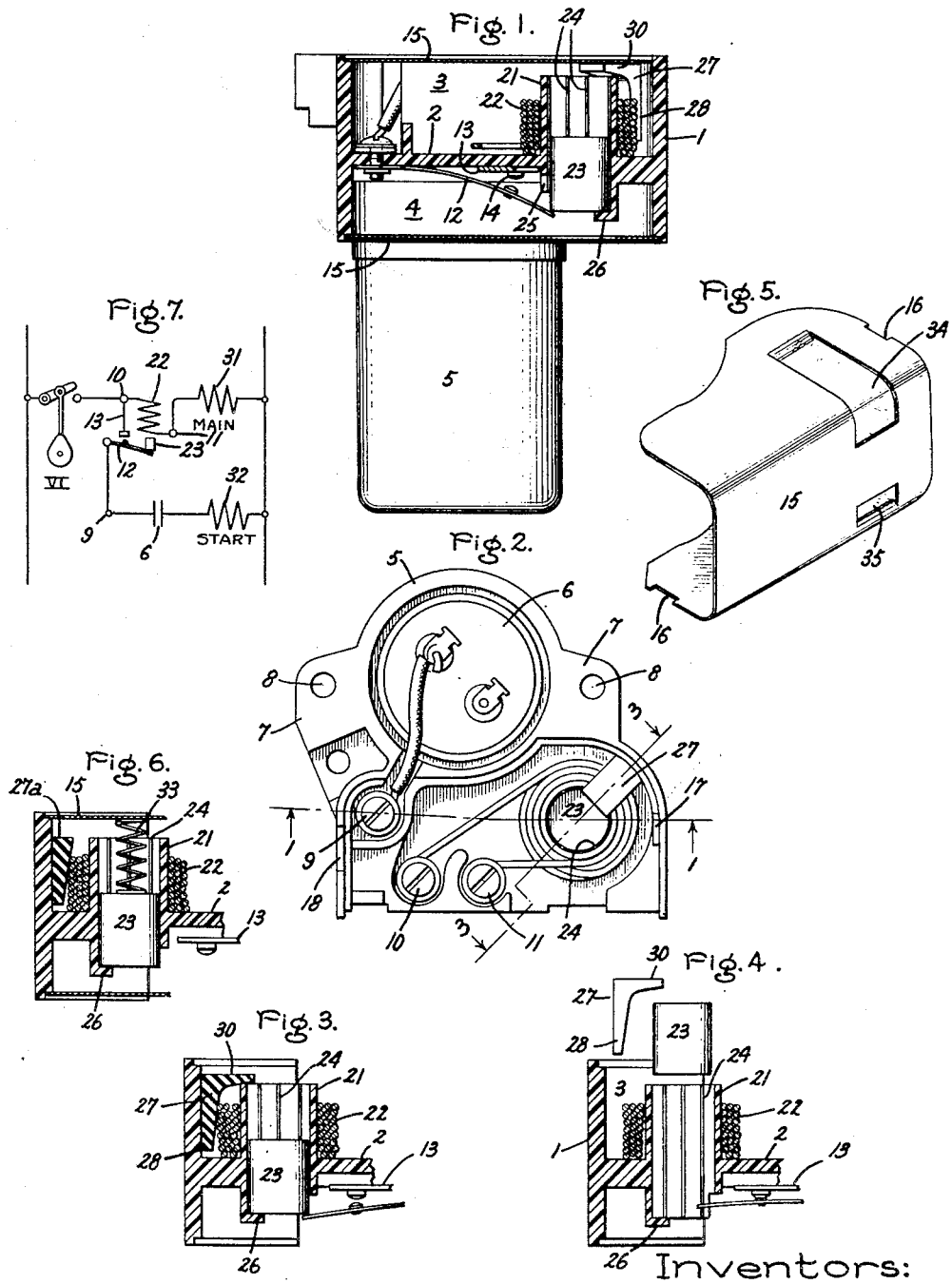

2,513,986

UNITED STATES PATENT OFFICE 2,513,986

ELECTROMAGNETIC SWITCH

Thomas T. Woodson, Bridgeport, and Jacob W. McNairy, Westport, Conn., assignors to General Electric Company, a corporation of New York Application June 22, 1949, Serial No. 100,678

3 Claims. (Cl. 200—111)

This invention relates to an improved mounting of a capacitor and relay for the starting system of capacitor-start motor-operated devices, such as automatic washing machines.

It is an object of the invention to provide a relay and capacitor mounting affording improved facilities for the assembly of the component parts, the electrical interconnection of the individual elements therein, and the inspection of the relay elements under operating conditions.

It is a further object of the invention to provide an improved mounting for a relay coil, having means for resiliently supporting the coil against displacement.

These and other objects of the invention are accomplished in a presently preferred embodiment by fabricating a structure having wall formations defining a relay housing and an adjacent capacitor receptacle; preferably the structure is molded from plastic materials having the desired physical and electrical insulation qualities. A web extending between said relay housing walls form respectively a relay coil compartment and a switch compartment, with an open ended sleeve communicating therebetween and providing a spool for the relay winding and a guide for a freely movable magnetizable plug which functions as the relay armature. The switch compartment contains a fixed contact and a cooperating leaf-spring contact biased to close therewith. With the relay coil de-energized, the plug engages the leaf spring, holding the switch contacts apart. We preform the coil and thereafter position it within the housing by slipping it over the cylindrical sleeve and securing its leads to suitable terminals. The coil is restrained against movement relative to the sleeve by a resilient, wedge-like structure, interposed between the coil and a wall of the chamber. A projection of said structure is brought into the path of armature movement to provide a shock-absorbing means limiting one direction of movement of the armature.

The foregoing will be more fully understood from the following detailed description, with reference to the drawing showing such presently preferred embodiment. In the drawing, Fig. 1 is a side elevation taken in section along lines 1—1 of Fig. 2; Fig. 2 is a top plan view of the device with the cover plate of the relay chamber removed; Fig. 3 is a detail of the relay in deenergized position taken in section on lines 3—3 of Fig. 2; Fig. 4 is an exploded view of the relay taken in section as in Fig. 3; Fig. 5 is a perspective of the closure plate for the relay chamber; Fig. 6 is a view similar to Fig. 3, showing a second embodiment, and Fig. 7 is a schematic wiring diagram.

The unitary capacitor and relay mounting of our invention includes a housing 1 having an intermediate web 2 which divides the housing into a relay compartment 3 and a switch compartment 4. Integral with the housing and positioned laterally thereof is a substantially cylindrical compartment 5, open at one end to receive a capacitor 6 positioned with its terminals at the open end, as appears in Fig. 2. The flanges 7 of the structure have suitable holes 8 through which may pass screws or the like for affixing the machine in the upright position shown in Fig. 1 to a suitable wall or structure of a washing machine (not shown). Web 2 carries the respective terminals 9, 10, and 11. Terminal 9 connects with a capacitor terminal, and additionally anchors a movable element 12 of the relay switch system. Terminal 10 connects via a bus bar or equivalent 13 to the fixed contact 14 of said switch. Switch member 12 is biased for movement to circuit closing position; and in lieu of a rigid member and cooperating biasing spring, we prefer to form the element as a spring leaf— for example, of beryllium copper. The front, bottom and top of the chamber (the front of the chamber being to the bottom of Fig. 2) are covered by a light sheet metal cap 15 notched as at 16 to snap over lugs 17 (one shown in Fig. 2) provided on the end walls of the structure. One end wall may be notched out, as at 18, Fig. 2, to permit the introduction of circuit connections.

Carried by web 2 and providing communication between compartments 3 and 4, is a relatively thin walled sleeve 21. The sleeve, in addition to mounting the relay coil 22, guides the magnetizable plug 23 which functions as the relay armature, and accordingly we prefer to provide ribs 24 projecting from the inner wall of the sleeve to reduce frictional contact between the armature and the sleeve wall. The wall of the sleeve within chamber 4 is cut away as at 25 to introduce the end of the switch element 12 into the path of armature 23. An integral stop 26 supports the armature at rest, in which position (Fig. 1) the switch element 12 is in fully open position. This may be assumed to be the "normal" position of the switch elements. The engagement of the armature 23 with spring contact leaf 12 serves to slow the drop of the armature before it engages the stop 26. The relay coil is preformed of relatively heavy wire and is installed in the device merely by slipping it over the sleeve 21 and affixing the coil ends to the respective terminals 10 and 11. It will be obvious that the distribution and effect of the lines of magnetic force resulting from energization of the coil will be influenced by the position of the coil; and as a means of positively restraining shifting of the coil laterally along the sleeve, as might occur during shipment of the apparatus, we provide a resilient wedge member 27, of rubber or the like. The leg 28 of said member is jammed between the end wall of the chamber 3 and the coil 22 to resiliently anchor said coil in position. The resulting distortion of the leg provides substantial frictional forces. It is expedient to provide the member 27 with a second leg, 30, which overlies the sleeve 21 to project across the open end thereof resiliently to arrest the upward movement of armature 23 as the coil 22 is energized. As appears in Fig. 1, the leg 30 is immediately beneath cap 15 and is buttressed thereby.

The invention may readily be adapted for installation in horizontal, or other positions in which gravity bias of armature 23 would be inadequate, by the use of a light coil spring or equivalent 33 within the sleeve 21 and extending between cap 15 and armature 23 to bias the latter toward the movable contact 12. Said spring cushions the armature while limiting the travel thereof, thus performing one of the functions of leg 30 of member 27. Accordingly, only a simple resilient wedge 27a is needed for relay coil support.

Fig. 7 shows a portion of the control circuit for an automatic washing machine, completely disclosed in the pending application Serial No. 639,817 of Thomas T. Woodson, a co-inventor herein, filed January 8, 1946 for "Control for Automatic Washing Machine" and assigned to the assignee of the present application. In such circuit, the cam VI completes a circuit through winding 22 and the main or running winding 31 of the motor. At this instant, the armature 23 had been resting upon the end of switch element 12 to hold the same in open circuit position. The coil 22 is so sized that the inrush current through the main winding picks up the armature, whereupon the element 12 springs to closed circuit position completing the circuit through the switch and the capacitor 6 to the starting winding 32 of the motor. As the motor starts and main winding 31 draws less current the relay 22 is insufficient to hold the armature, which thereupon drops upon the stop 26 and in so doing, opens the starting winding circuit, corresponding to conventional operation of such a motor. To facilitate inspection of the switch and armature action under actual service conditions, we provide the cover 15 with openings 34, 35, glazed with suitable transparent material. Window 34 exposes the coil 22 and member 27 to view, whereas window 35 is in the view area of the switch element 12.

While we have shown a particular embodiment of our invention, it will be understood, of course, that we do not wish to be limited thereto since many modifications may be made; and we therefore contemplate by the appended claims to cover any such modifications as fall within the true spirit and scope of our invention.

What we claim as new and desire to secure by Letters Patent of the United States is:

1. Apparatus of the class described, comprising walls defining a housing; a web extending between certain of said walls to divide said housing into compartments; a sleeve extending through said web and communicating between said compartments; a relay coil enveloping said sleeve in one of said compartments; a fixed switch element and a therewith cooperating movable element disposed in a second compartment, said movable element comprising a spring leaf biased to engage said fixed element, a free end of said leaf projecting into said sleeve intermediate the ends thereof; a magnetic armature freely movable in said sleeve and by gravity biased to engage said spring leaf to urge the same into open circuit position; and resilient means disposed between said coil and a chamber wall to frictionally restrain said coil against movement relative to said sleeve, said means having a resilient member projecting into the path of armature movement when attracted by coil energy to interrupt the movement thereof.

2. A relay mounting, comprising walls of electrical insulation material defining a housing; a web integral with said walls and extending therebetween to divide said housing into compartments; an open-ended, elongated sleeve integral with said web and communicating between said compartments; a relay coil wound about said sleeve, in one of said compartments; means for connecting said coil to power to energize the same; a plug of magnetizable material freely slidable in said sleeve; a fixed switch element and a therewith cooperating movable element of spring material disposed within a second compartment, said switch elements each being carried by said web and said movable element being biased to engage said fixed element; means on said movable switch element projecting into the path of movement of said plug to be engaged thereby prior to one extreme of movement thereof for operating said switch element to open circuit position; and a resilient element disposed in said first named compartment and extending transversely of said sleeve to limit the movement of said plug in an opposite direction, said plug during said last named movement releasing said springable switch element for movement to closed circuit position.

3. A relay mounting, comprising walls defining a housing; a web extending between certain of said walls substantially centrally within said housing; a sleeve of non-magnetic material carried by said web; a relay coil wound about said sleeve at one end thereof, said sleeve having terminal connections insulatedly carried by said web; a plug of magnetizable material guided for freely slidable movement within said sleeve; a fixed switch element carried by said web; a movable switch element for cooperation with said fixed element and spring biased to assume a predetermined circuit position relative thereto; means on said movable switch element projecting into said sleeve intermediate the ends thereof to be engaged by said plug during one direction of travel thereof and urged thereby into an opposite circuit position, said switch element means serving resiliently to interrupt travel of said plug in said one direction; a wedge of resilient material disposed between a wall of said housing and said relay coil to hold the coil against displacement relative to the sleeve; and means integral with said resilient wedge and extending transversely of said sleeve to provide a resilient stop for said plug in the opposite direction of travel.

THOMAS T. WOODSON.
JACOB W. McNAIRY.

REFERENCES CITED

The following references are of record in the file of this patent:

UNITED STATES PATENTS

| Number | Name | Date |
|---|---|---|
| 360,123 | Thomson | Mar. 29, 1887 |
| 900,320 | Snell | Oct. 6, 1908 |
| 1,034,583 | Cavanagh | Aug. 6, 1912 |
| 1,729,222 | Lake | Sept. 24, 1929 |
| 1,729,800 | Scott | Oct. 1, 1929 |
| 1,947,291 | Ford | Feb. 13, 1934 |
| 2,076,849 | Kennedy | Apr. 13, 1937 |
| 2,104,399 | Kuhn | Jan. 4, 1938 |

FOREIGN PATENTS

| Number | Country | Date |
|---|---|---|
| 499,880 | France | Dec. 1, 1919 |